Oct. 17, 1967

S. E. BUNN ETAL 3,347,264

SUCTION AND DISCHARGE VALVE

Filed Dec. 23, 1963

INVENTORS.
STUART E. BUNN and
HERBERT B. OWSLEY
BY
Fishburn and Gold
ATTORNEYS

Oct. 17, 1967  S. E. BUNN ET AL  3,347,264
SUCTION AND DISCHARGE VALVE
Filed Dec. 23, 1963  2 Sheets-Sheet 2
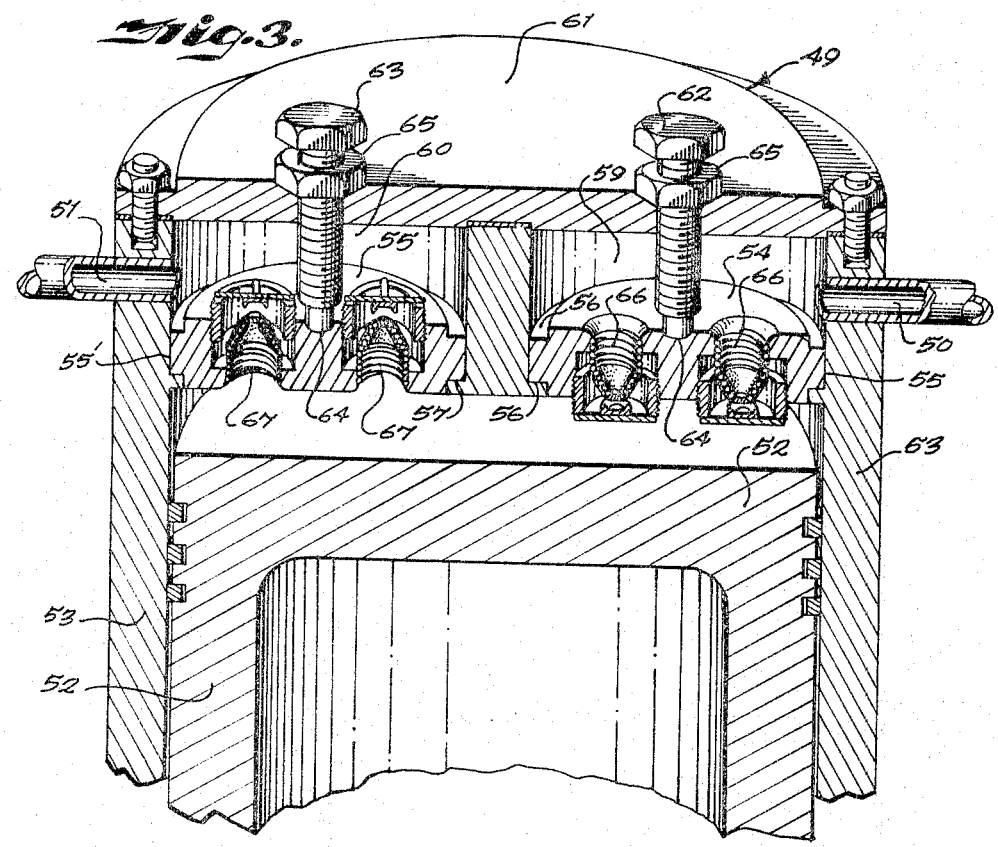
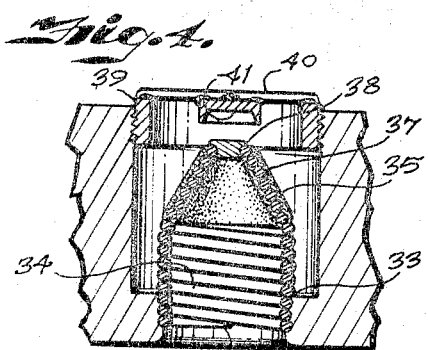
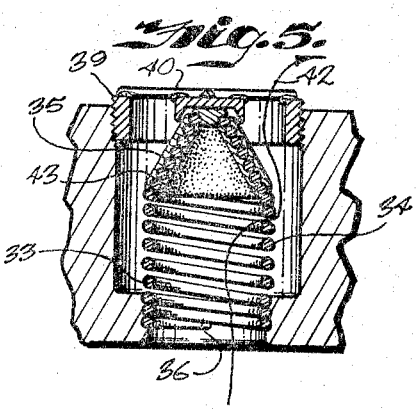
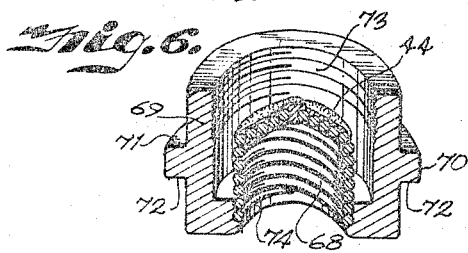
INVENTOR.
STUART E. BUNN and
HERBERT B. OWSLEY
BY
Fishburn and Gold
ATTORNEYS

United States Patent Office 3,347,264
Patented Oct. 17, 1967

3,347,264
SUCTION AND DISCHARGE VALVE
Stuart E. Bunn, P.O. Box 8871, Prairie Village, Kans. 66208, and Herbert B. Owsley, 8509 W. 70th Terrace, Shawnee Mission, Kans. 66204
Filed Dec. 23, 1963, Ser. No. 332,659
3 Claims. (Cl. 137—512.1)

This invention relates to rapid acting fluid flow control valves suitable for reciprocating piston compressors.

The principal objects of the present invention are: to provide a rapid acting extremely long life valve suitable for piston compressors; to provide such a valve which requires less travel in operation and little or no adjustment or maintenance over long periods in use; to provide such a valve which has low inertial characteristics thus minimizing noise and wear in operation; to provide a pressure responsive valve which requires little pressure differential to operate and presents very low resistance to fluid flow therethrough; to provide such a valve which requires no lubrication and is operable over an extended range of pressure and cycle rate while remaining nonresonant for long life and high efficiency; to provide such a valve which is easily adapted to forms for replacing the valves in existing compressors; and to provide such a valve which is generally lower in cost than prior art valves.

Other objects and advantages of this invention will become apparent from the following description taken in connection with the accompanying drawings wherein are set forth by way of illustration and example certain embodiments of this invention.

FIG. 3 is a longitudinal perspective cross-sectional view through another type of compressor cylinder and provided with separate suction and discharge valve assemblies embodying this invention.

FIG. 4 is a fragmentary cross-sectional view on an enlarged scale through a valve assembly showing details of a valve element in closed position.

FIG. 5 is a view similar to FIG. 4 showing the valve element in an open or flow-through position.

FIG. 6 is a longitudinal perspective cross-sectional view through a modified form of valve assembly.

Figure 1:
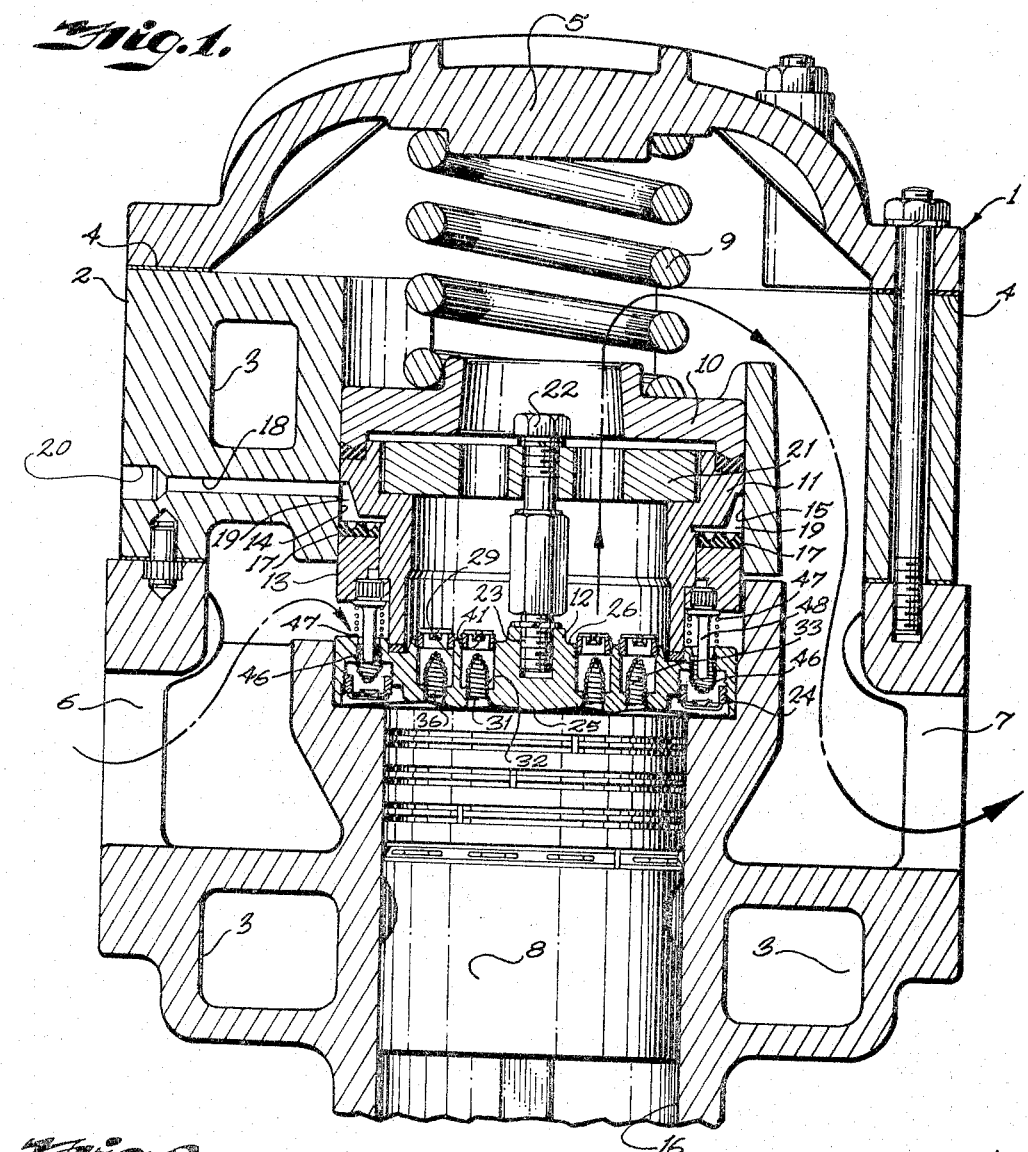
FIG. 1 is a longitudinal cross-sectional view through a compressor cylinder having a suction and discharge valve assembly embodying this invention.

Referring to the drawings in more detail:

The reference numeral 1 generally indicates a cylinder assembly of a reciprocating piston gas compressor. The cylinder assembly 1 includes a jacket 2 having liquid receiving cooling passageways 3, a gasket 4 located between a removable head portion 5 and the jacket 2, a suction passageway 6, and a discharge passageway 7 formed therein, and a reciprocating piston 8. The cylinder assembly 1, in the illustrated example of FIG. 1, includes a safety head spring 9 bearing at one end thereof against the head portion 5 and at the other end thereof against a spring guide 10. The spring guide 10 is urged by the spring 9 against a valve retainer ring 11 which in turn resiliently bears against a suction and discharge valve assembly 12. A capacity control lift piston 13 is slidably mounted on the internal wall 14 of a bore 15 coaxial with the piston bore 16 and located directly thereabove. The lift piston 13 has a suitable packing 17 sealing it slidably against the wall 14. A fluid pressure control passageway 18 extends through the jacket 2 into a chamber or space 19 located just above the piston packing 17 whereby control pressure introduced into the passageway 18 through a suitable receiver 20 produces a relative movement of the lift piston 13 for reasons noted hereafter.

A circular valve clamp 21 is nested centrally within the valve retainer ring 11 and has a bolt 22 extending coaxially toward and anchored into the suction and discharge valve assembly 12 at 23. It is to be understood that an excessively high pressure differential generated on opposite sides of the valve assembly 12 will cause it to move against the pressure of the safety head spring 9 thus relieving the pressure build-up immediately above the piston 8.

The valve assembly 12 comprises a circular plate valve seat member 24 having a lower face 25 directed toward the piston 8 and an upper face 26 directed away from the piston 8. The seat member 24 includes a group or plurality of inner bores 27, in the illustrated example eight in number, extending radially in respective pairs from the bolt anchor at 23, and a group or plurality of outer bores 28 circumferentially spaced about the seat member periphery and also being eight in number. Each bore in the respective groups 27 and 28 forms a passageway communicating between the upper and lower faces 25 and 26. As more fully described hereinafter the bores in the group 27 are associated with exhaust valve units and the bores in the group 28 are associated with suction valve units.

The bores in the group 27 each have a cylindrical wall first part 29 of a first diameter and extending partially into the seat member 24 from the upper face 26 thereof and including a screw thread 30 adjacent the upper portion of the respective first part 29. The bores in the group 27 also include a second part 31 having a threaded wall of a smaller diameter than the diameter of the first part 29 and extending partially into the seat member 24 from the lower face 25. The second part 31 communicates coaxially with the first part 29 forming a shoulder 32 therebetween.

A valve element or coil spring 33 of normally mutually engaging convolutions is located in each of the bores in the group 27 and has a cylindrical portion 34 and a coaxial conical portion 35 joined together within the bore first part 29. The spring cylindrical portion 34 has a downwardly open end 36 formed by a few turns or convolutions which are threadedly engaged or anchored in the bore second part 31, the conical portion 35 being unsupported. The conical portion 35 decreases in diameter in a direction extending away from the open end 36 and, in the illustrated example, the small end 37 of the conical portion 35 is closed by a suitable plug 38, however, the spring itself may be used for closure if desired by bending the last convolution over the center. The diameter of the bore first part 29 is substantially greater than that of the spring cylindrical portion 34.

A cap 39 is engaged in the thread 30 at the upper portion of the first part 29 adjacent the upper face 36. The cap 39 includes a flow permitting spider portion 40 projecting centrally of the bore and supporting a stop member 41 coaxially of the bore. The stop member 41 is positioned to engage the plug 38 when the spring 33 is elongated due to greater fluid pressure being applied on the lower face 25 than on the upper face 26. This pressure differential induces an upward flow through the respective bores 27 and occurs when the piston 8 is travelling upwardly, or in other words, on the compression stroke. Referring to FIG. 5 a valve element is illustrated in the elongated or open position with the fluid 42 flowing therethrough between the convolutions. At the end of the compression stroke the resiliency of the spring rapidly closes the convolutions together forming a tight positive seal.

Figure 2:
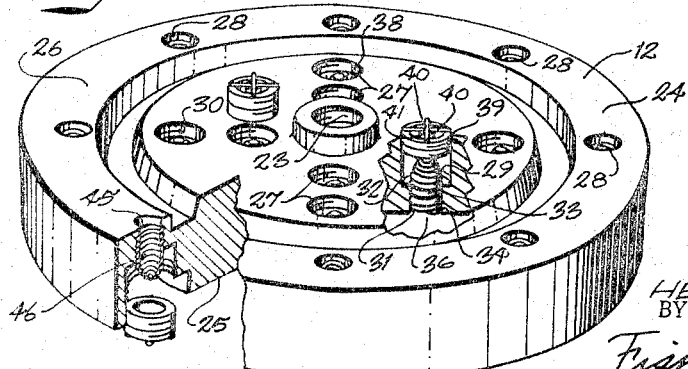
FIG. 2 is a partially exploded perspective view of the suction and discharge valve assembly on an enlarged scale with portions broken away to show suction and exhaust valve elements therein.

The valve element is illustrated in FIGS. 4, 5 and 6 with a suitable plastic resin or metallic binding substance 43 retaining the convolutions of the conical portion 35 together permitting flow only through the cylindrical portion 34. The resin or metallic substance 43 on the conical portion 35 is not necessary in all cases for valve operation (FIGS. 1, 2) but sometimes is desired for altering the flow and inertial characteristics at particular frequencies and pressure conditions by weighting and flow directing effects. Another function of the resin or metallic substance 43 is to provide additional strength on the conical portion 35 and thus prevent a tendency for the conical portion to collapse or invert under high differential closure pressure. This danger is more likely to be experienced in a valve element of the type illustrated in FIG. 6 wherein the conical portion 44 has a flatter angle than the conical portion 35.

Referring again to the seat member 24 (FIG. 2) the outer bores 28 are similar to the inner bores 27 described above except that they are inverted so that the threaded wall second part 45 communicates with the upper face 26 rather than the lower face 25. Coil springs or valve elements 46 are mounted on the second part 45 inverted compared to the springs 33 described above. It is apparent that in normal operation the downward or suction stroke of the piston 8 causes a lowering of fluid pressure in the cylinder producing a pressure differential with respect to the suction passageway 6 which in turn causes the intake valve elements 46 to open downwardly allowing intake flow into the cylinder.

A plurality of capacity control springs 47 abut the upper face 26 surround the respective bore second parts 45 for urging the lift piston 13 upwardly away from the valve seat member 24. A plurality of relief pins 48 extend coaxially through the respective springs 47 and are adapted to extend into the respective valve elements 46. The relief pins 48 have an outside diameter substantially smaller than the inside diameter of the valve elements 46 whereby the fluid being compressed can flow with little restriction thereabout during normal operation. When it is desired to unload the particular cylinder assembly without stopping the reciprocation of the piston, a suitable fluid responsive to a control dimension such as discharge pressure is inserted under pressure into the passageway 18 for depressing the lift piston 13 against the capacity control springs 47. This causes the relief pins 48 to stretch out or extend the valve element 46 so that they do not close upon the upward or compression stroke of the piston 8. Thus, the fluid in the cylinder above the piston merely exhausts back through the convolutions of the intake valve elements 46 rather than through the exhaust elements 33 and therefore do not disturb or add to the compressed fluid in the discharge pasageway 7.

Referring to FIG. 3 an additional embodiment of this invention is illustrated forming part of a cylinder assembly 49 having a suction or intake tube 50 and a discharge or exhaust tube 51. The cylinder assembly 49 includes a reciprocating piston 52, cylinder wall 53 and separate intake and exhaust valve seat assemblies 54 and 55, respectively. The valve seat assemblies 54 and 55 are each in the form of a disc having a central peripheral radial ring 55 forming oppositely directed shoulders 56 one of which is engaged with a shoulder 57 on the cylinder assembly and preventing motion of the seat assemblies downwardly with respect to the cylinder assembly 49. The valve seat assemblies 54 and 55 each form the lower wall of respective intake and exhaust chambers 59 and 60, the upper wall of which is formed by a cylinder head 61 and the side walls of which are integral with the cylinder wall 53. The intake and discharge tubes 50 and 51 respectively communicate with the intake and exhaust chambers 59 and 60. In order to prevent the respective seat assemblies 54 and 55 from moving upwardly under the force of the compressed fluid within the cylinder above the piston 52, screws 62 and 63 are threadedly engaged in and extend through the cylinder head 61 and have the lower ends 64 thereof abutting the upper surface of the valve seat assembly and urging same tightly against the shoulder 57. Suitable lock nuts 65 prevent the screws 62 and 63 from rotating after being positioned.

The valve seat assemblies 54 and 55 each have a pair of valve elements respectively designated 66 and 67 engaged therein in the same manner as described above in connection with the valve assembly 12, the difference being that the seat assemblies 54 and 55 are identical to each other and exteriorly axially symmetrical. Thus, each may operate as either a suction valve seat or exhaust valve seat assembly merely by inversion and insertion into the respective chambers 59 and 60.

A further modification of this invention is illustrated in FIG. 6 wherein the valve spring or element 68 is mounted in an individual carrier 69 having a central peripheral radially extending ring 70 forming oppositely directed shoulders 71 and 72 adapted to support the carrier either with the conical portion 44 extending upwardly or downwardly within a suitable seat (not shown) so as to act either as an exhaust valve element or an intake valve element. If desired, a spider cap such as described above (39, 40, 41) may be threadedly engaged in internal threads 73 located near the opposite end of the carrier 69 from the element open end 74.

The coil spring valve elements described herein have been found to permit large port openings and low flow resistance with low inertial mass and low dynamic oscillation under high speed and load conditions. It is to be understood that the element diameter and cross sectional shape of the spring wire as well as the spring preload, length of the respective cylindrical and conical portions and the weighting and permanent closure of the conical portions may be varied for maximum efficiency and long life. The valve elements are easily removed and replaced when necessary by rotation with respect to the anchoring threads. Because the element is exposed to relatively low stress in use, chances of fatigue failure are quite small.

It is to be further understood that while certain forms of this invention have been illustrated and described, it is not to be limited to this specific form or arrangements of parts herein described and shown, except insofar as such limitations are included in the claims.

What we claim and desire to secure by Letters Patent is:

1. A rapid acting unidirectional positive fluid flow control valve comprising, a valve seat member having an opening through which fluid flows, a coil spring having normally mutually engaging convolutions with means closing one end, said coil spring having an open end oppositely directed to said closed end and having a portion cylindrical in shape extending from said open end, said means closing said one end including a conical spring portion having a shape decreasing in diameter from the diameter of said cylindrical spring portion in a direction away from said open end, means including screw threads at said valve seat member opening and engaged by a plurality of convolutions of the spring adjacent said open end for securing said spring on said valve seat member with said open end communicating with said opening and said closed end free to move resiliently away from said open end, said end closing means and conical spring portion thereof permitting spreading apart only the convolutions in the cylindrical spring portion spaced from said securing means and said closed end under fluid pressure directed through said opening toward said closed end whereby spreading of said cylindrical spring portion convolutions forms a flow slot therebetween for passage of fluid, and in absence of said fluid pressure said convolutions engaging to form a tight seal therebetween.

2. The valve as set forth in claim 1 including stop means fixed with respect to said seat member and aligned with said coil spring, said stop means being normally spaced from said closed end and adapted to contact said closed end to prevent excess movement of said closed end away from said open end.

3. A reciprocating piston compressor valve assembly of the plate type comprising: a circular plate valve seat member having a lower face for directing toward the piston and an upper face for directing away from the piston, said seat member having a plurality of bores extending axially thereinto forming passageways communicating between said faces, said passageways each having a cylindrical wall first part of a first diameter and extending partially into said seat member and a second part of a smaller diameter than said first diameter and extending partially through said seat member, said second part communicating coaxially with said first part, a coil spring of normally mutually engaging convolutions in each of said passageways and having a cylindrical portion and a coaxial conical portion joined together in said first part, said spring cylindrical portion having an open end, means including screw threads engaged by a plurality of convolutions of said cylindrical portion adjacent said open end for securing said spring in said second part, said spring conical portion decreasing in diameter in a direction away from said cylindrical portion open end and terminating in an open end, means securing the convolutions of said conical portion together and permitting flow opening of only the cylindrical portion of the spring, a plug closing said conical portion open end, said first part being of substantially greater diameter than said spring cylindrical portion, said spring having its open end in communication with the respective passageway with the closed conical end portion free to move resiliently away from said open end for spreading apart spring convolutions spaced between said securing means and said closed conical end under fluid pressure directed through said passageway whereby the spreading of said spring convolutions form a flow slot therebetween for passage of fluid, a cap engaged in said first part adjacent said upper face and including a stop member aligned with and normally spaced from said spring conical portion, said stop member engaging said plug when said convolutions on said spring cylindrical portion are separated due to differential fluid pressure between said lower face and upper face.

References Cited

UNITED STATES PATENTS

| | | | |
|---|---|---|---|
| 1,698,567 | 1/1929 | Small | 137—454.4 |
| 1,926,030 | 9/1933 | Boynton | 137—533.17 |
| 2,125,435 | 8/1938 | Erling. | |
| 2,599,898 | 6/1952 | Dalrymple | 137—454.4 |
| 2,981,462 | 4/1961 | Niedermayer | 137—533.17 |
| 3,077,206 | 2/1963 | Graham. | |

FOREIGN PATENTS

| | | |
|---|---|---|
| 8,571 | 4/1901 | Great Britain. |
| 45,489 | 3/1927 | Norway. |

WILLIAM F. O'DEA, *Primary Examiner.*

H. COHN, *Assistant Examiner.*